March 9, 1965 N. HARTLEY 3,172,175
AUTOMATIC SUPPLYING, MIXING, MOISTURE CONTROL
AND DELIVERY OF GRANULAR MATERIAL
Filed Aug. 10, 1953 7 Sheets-Sheet 3
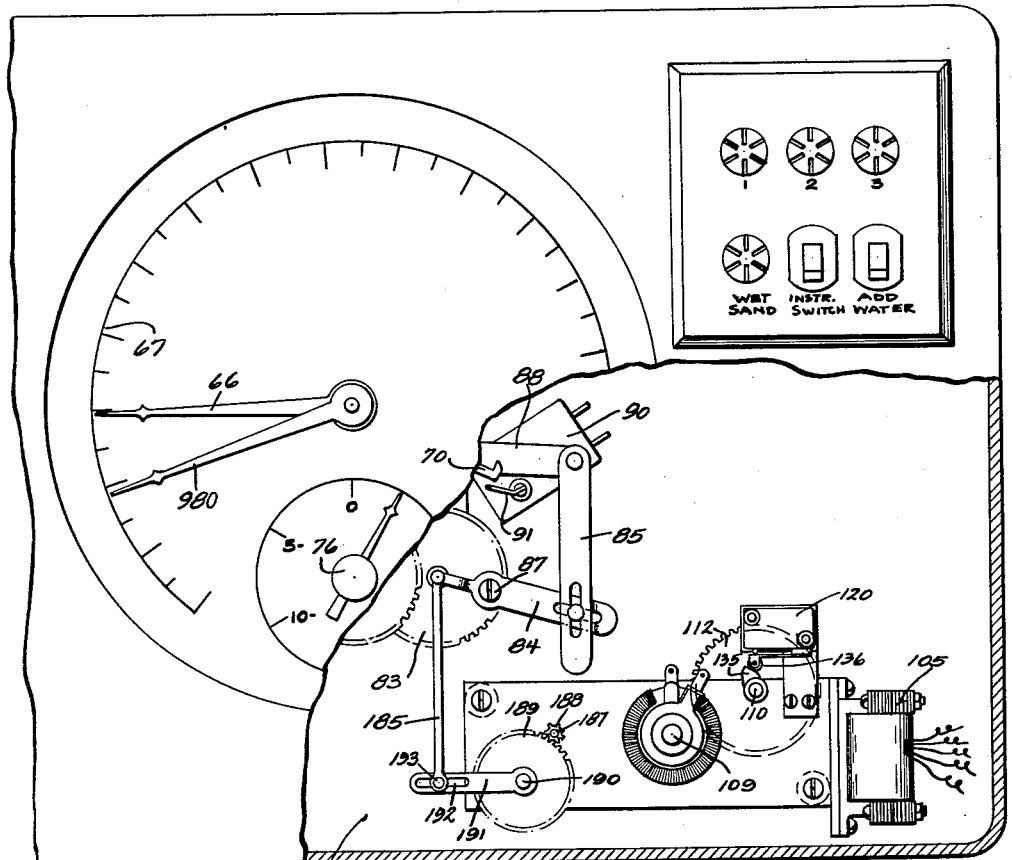
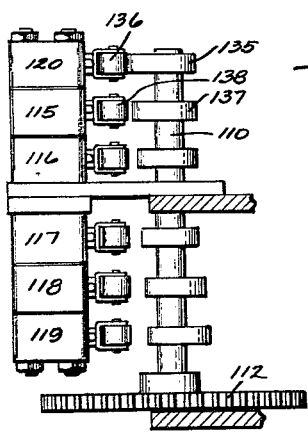
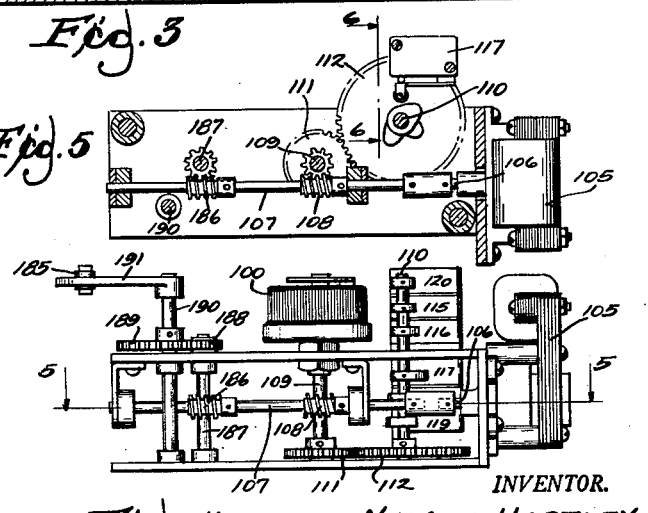
INVENTOR.
NELSON HARTLEY
BY
Wheeler, Wheeler & Wheeler
ATTORNEYS March 9, 1965 N. HARTLEY 3,172,175
AUTOMATIC SUPPLYING, MIXING, MOISTURE CONTROL
AND DELIVERY OF GRANULAR MATERIAL
Filed Aug. 10, 1953 7 Sheets-Sheet 4
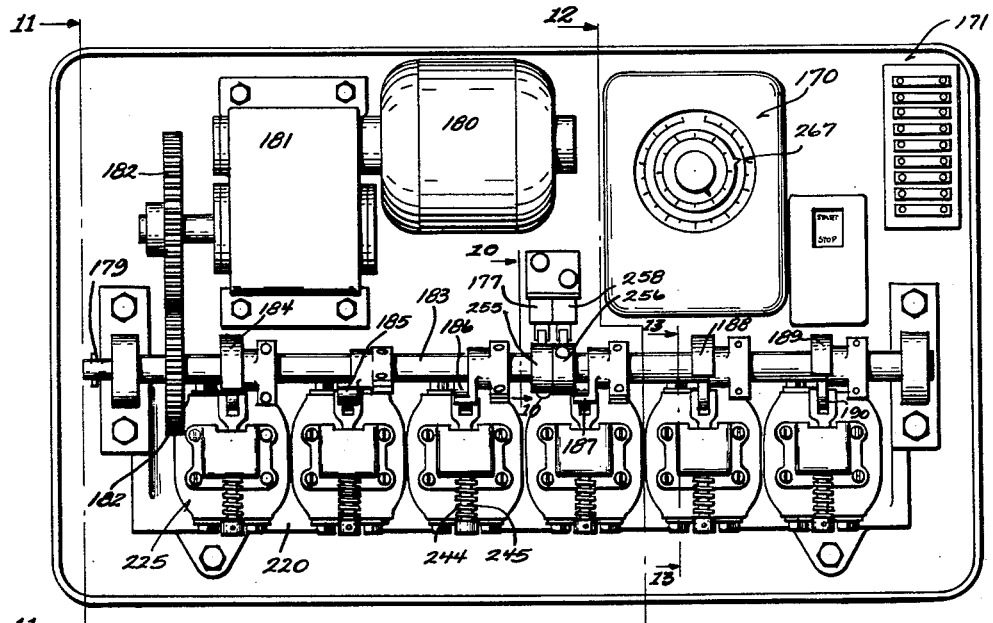
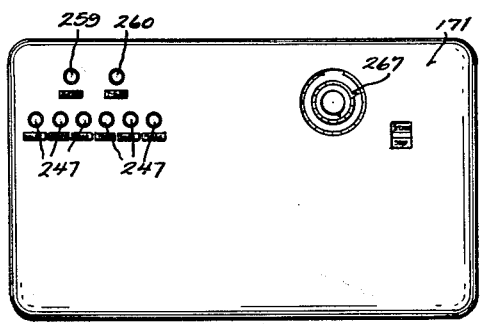
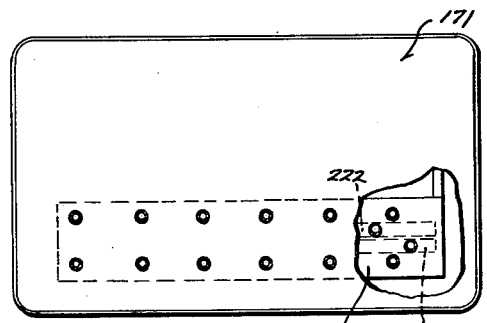
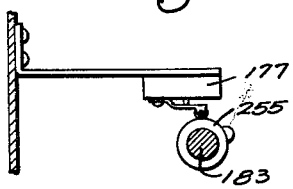
INVENTOR.
NELSON HARTLEY
BY
Wheeler, Wheeler & Wheeler
ATTORNEYS

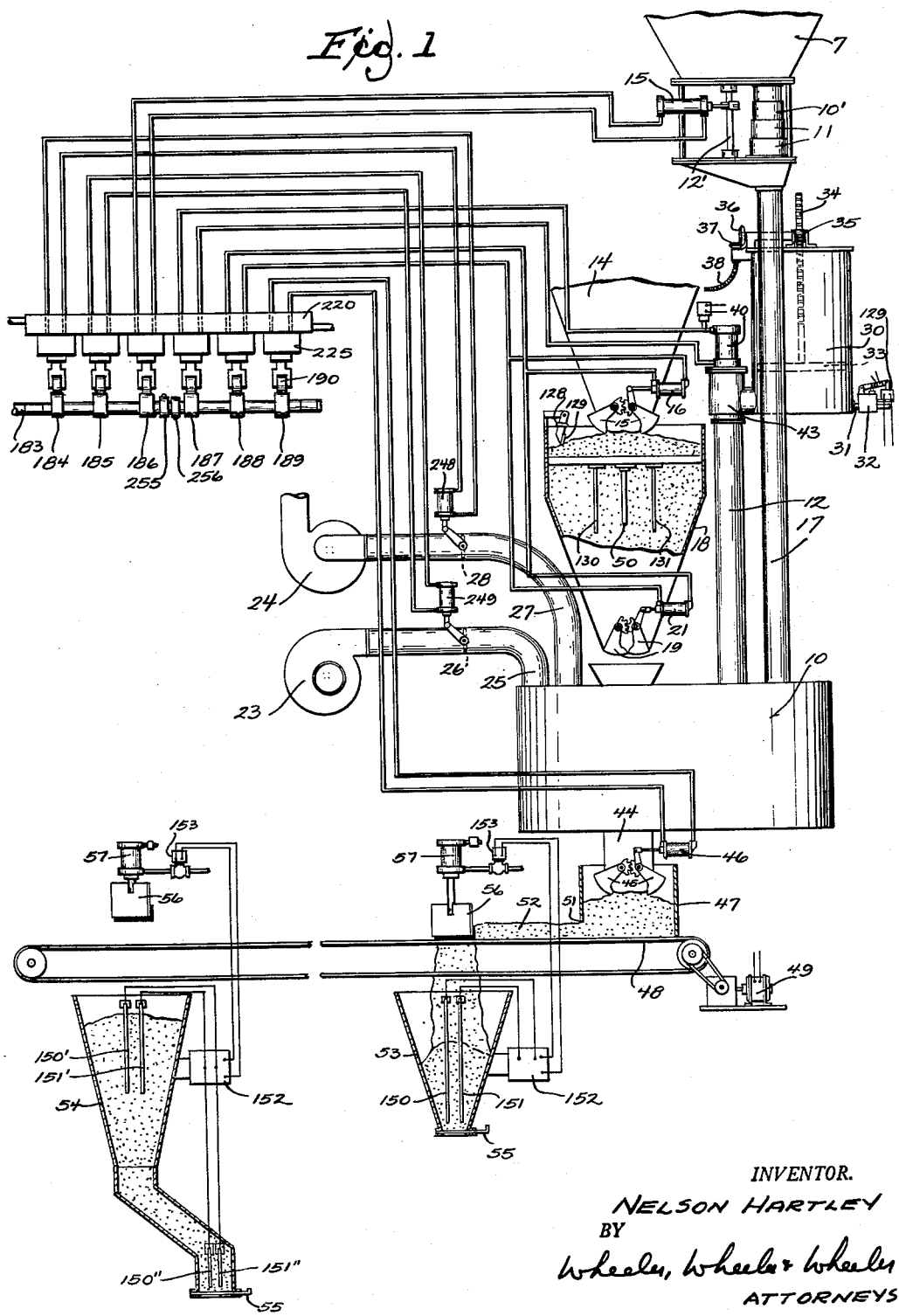

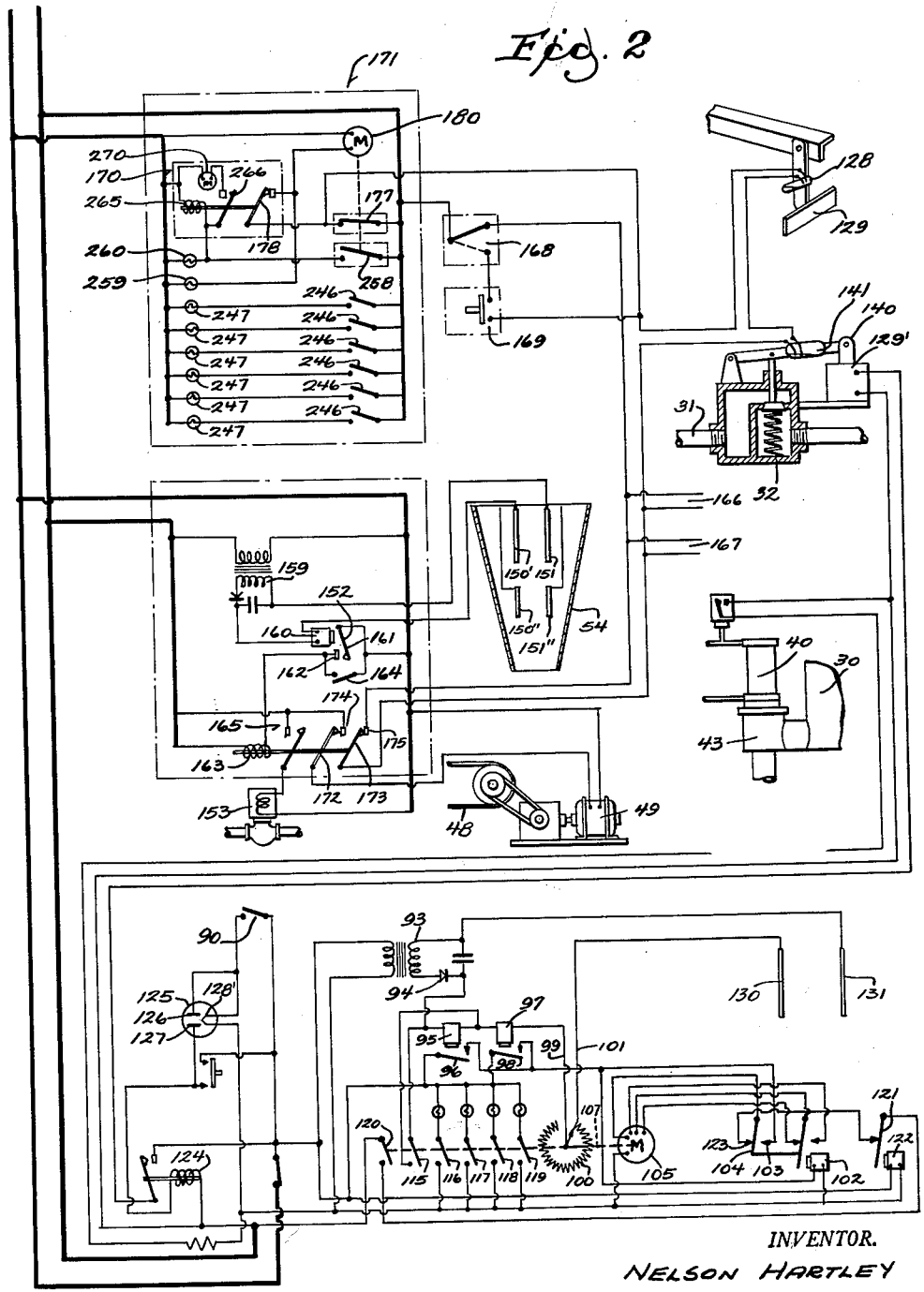

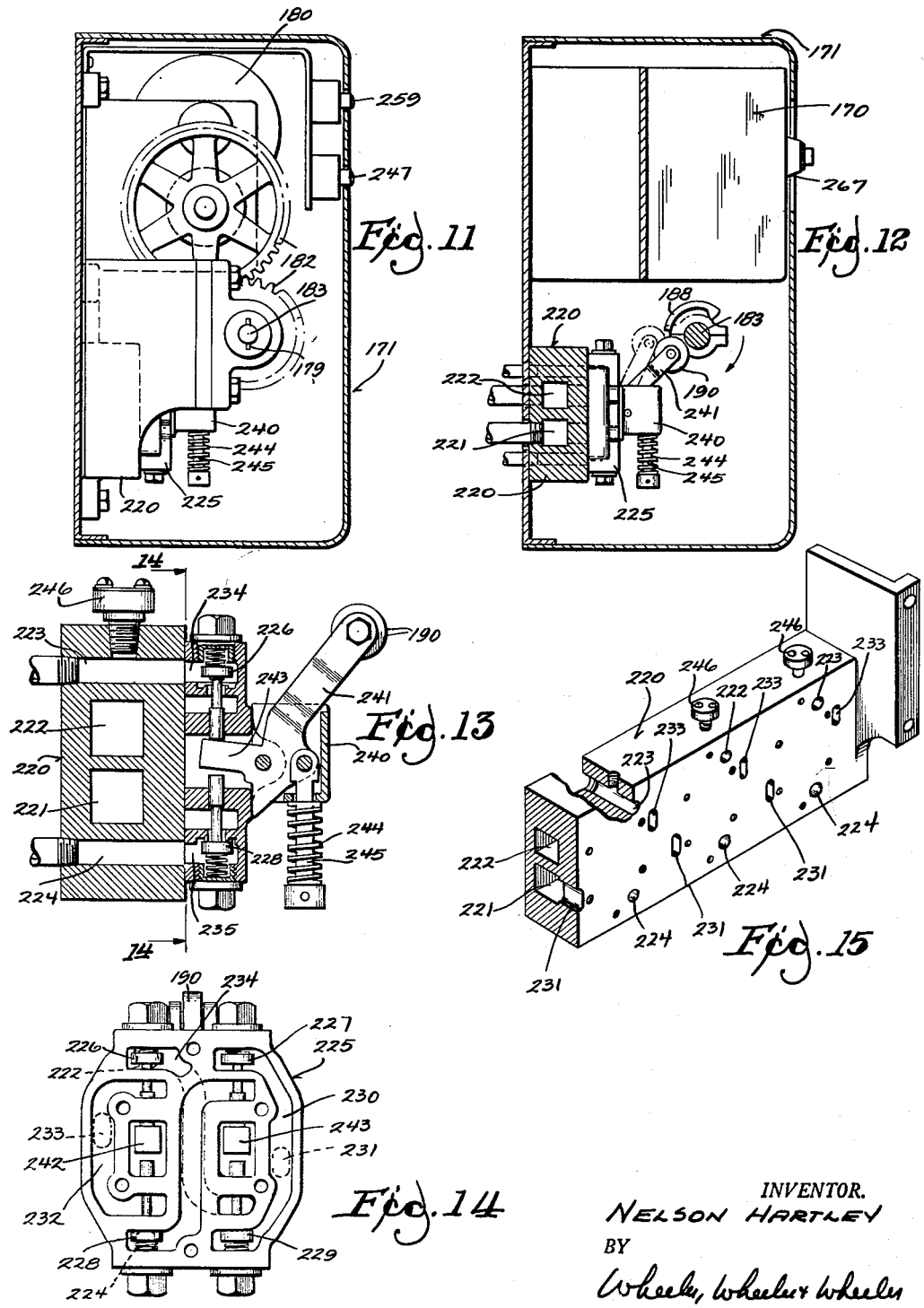

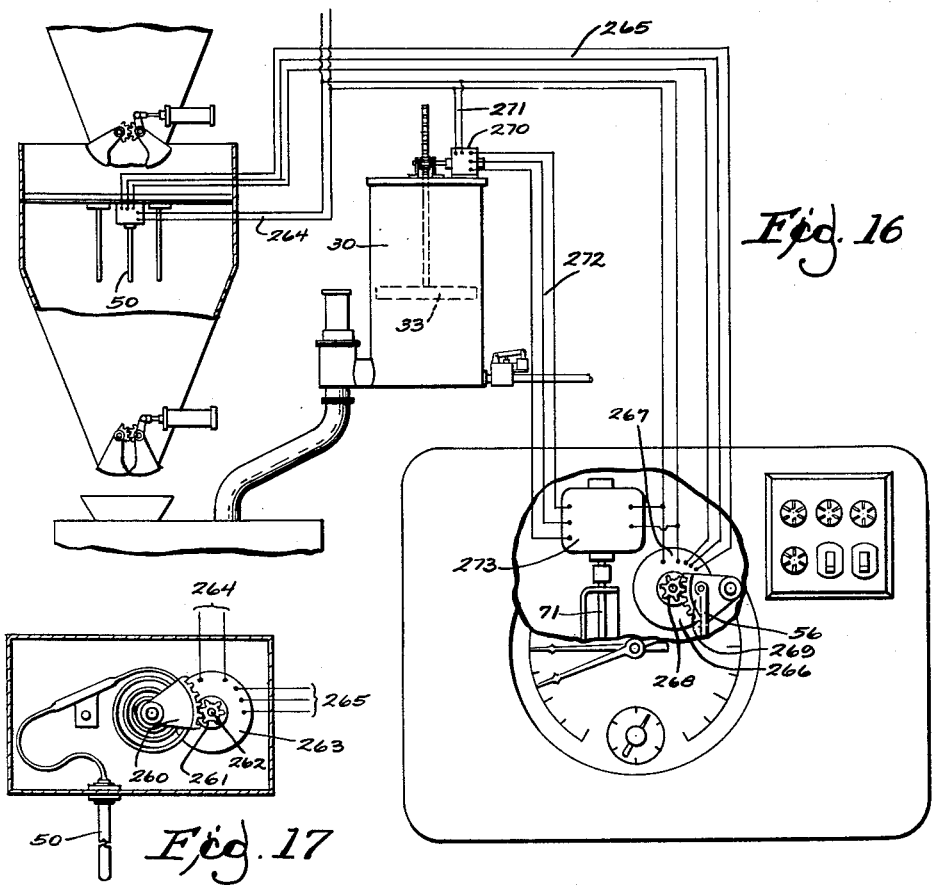
Fig. 16
Fig. 17
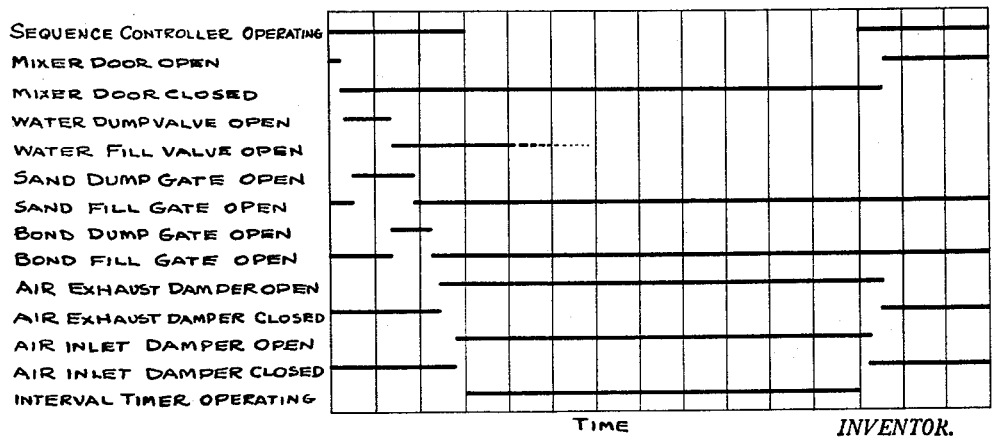
| | |
|---|---|
| Sequence Controller Operating | |
| Mixer Door Open | |
| Mixer Door Closed | |
| Water Dump Valve Open | |
| Water Fill Valve Open | |
| Sand Dump Gate Open | |
| Sand Fill Gate Open | |
| Bond Dump Gate Open | |
| Bond Fill Gate Open | |
| Air Exhaust Damper Open | |
| Air Exhaust Damper Closed | |
| Air Inlet Damper Open | |
| Air Inlet Damper Closed | |
| Interval Timer Operating | |
Time
Fig. 22

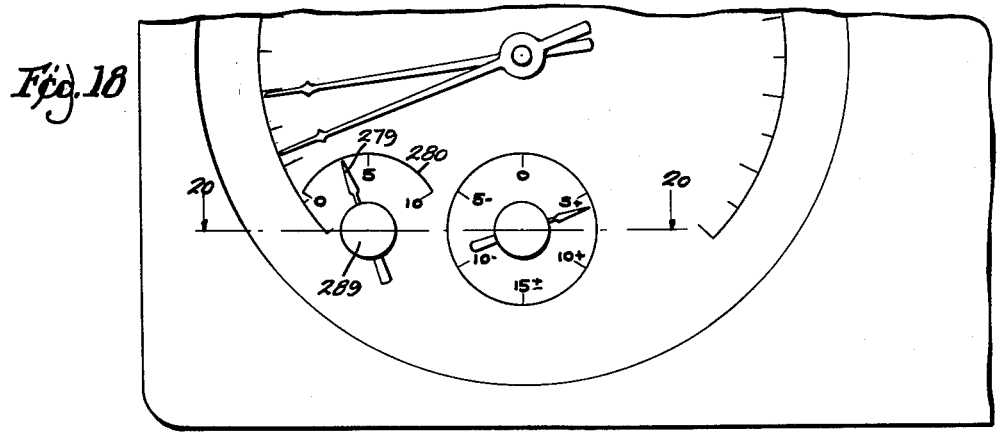
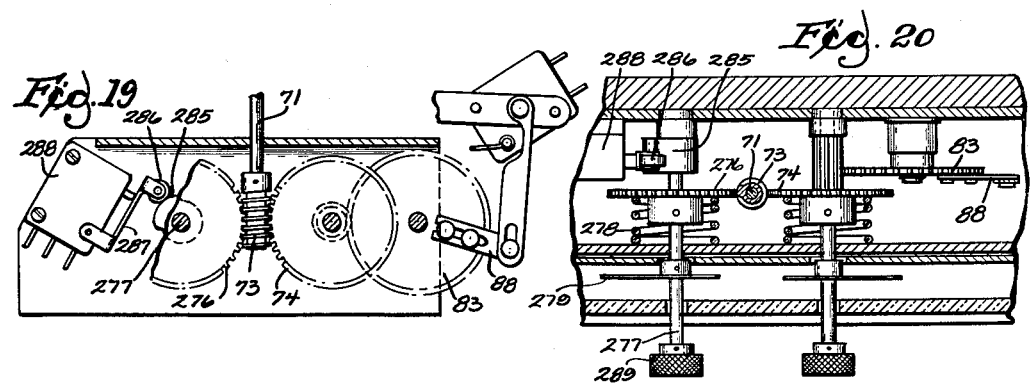
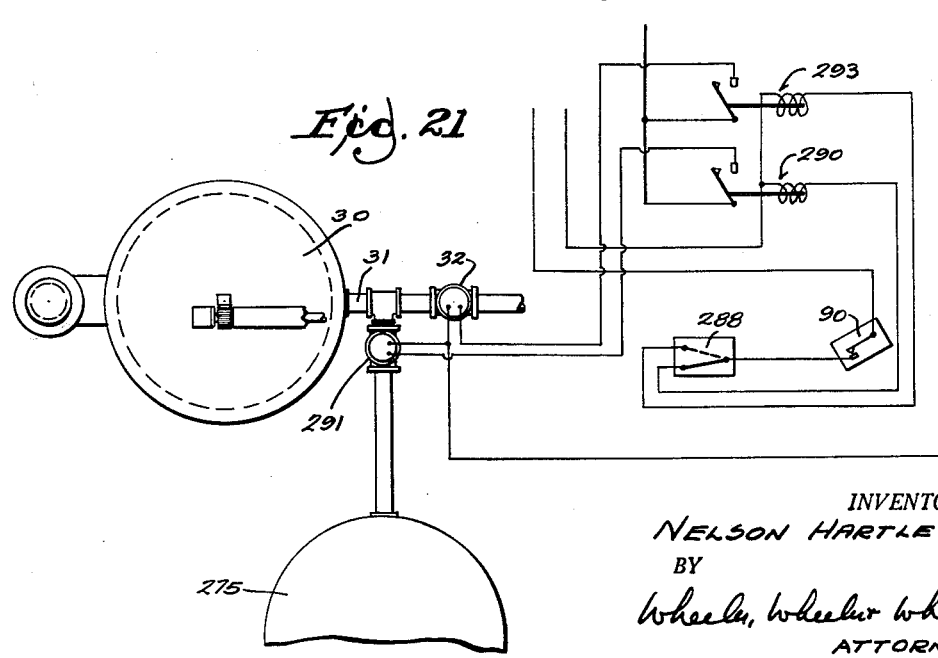

United States Patent Office 3,172,175
Patented Mar. 9, 1965

3,172,175
AUTOMATIC SUPPLYING, MIXING, MOISTURE CONTROL AND DELIVERY OF GRANULAR MATERIAL
Nelson Hartley, Baltimore, Md., assignor to Hartley Controls Corporation, a corporation of Wisconsin
Filed Aug. 10, 1953, Ser. No. 373,229
4 Claims. (Cl. 22—89)

This invention relates to the completely automatic supplying, mixing, moisture control and delivery of foundry sand. This application is a companion to my application 279,369, filed March 29, 1952, and entitled "Device for Supplying to a Foundry Sand Mixer Water and Sand in Automatically Predetermined Proportions According to Sand Temperature," now U.S. Patent 2,709,843, granted June 7, 1955.

As in the device of the above identified companion application, the present device automatically measures and mixes with the sand an amount of water proportioned to the initial moisture of the sand and to its initial temperature. However, whereas the device of my former application determined the moisture requirements in steps, the device of the present application is infinitely variable within its range for the stepless determination of the precise moisture requirements. This is accomplished by passing current between probes or electrodes deeply embedded in the sand in a hopper in which the sand is stored preliminary to delivery into the mixer and by using a circuit in the nature of a Wheatstone bridge to arrest flow of water into the storage tank when the current controlled by a rheostat positioned according to the amount of water in the tank matches the flow of current between the probes in the sand.

In addition, the device of the present application automatically controls a cycle which is initiated automatically whenever sand is needed in any one of a number of molding stations and which proceeds automatically through the stages of metering, mixing and delivering such sand to the required station or stations, the cycle being self-repeating as long as the demand for sand continues, and automatically terminating when the demand terminates. To this end, I provide a sand storage bin discharging into the metering hopper above described, subject to the control of gates operated in alternation with those of the hopper. This mixer, into which the hopper dumps, has gates which deliver the sand onto a conveyor belt in a layer of uniform depth as required by the movement of such belt. The belt serves the various molding stations, these having individual hoppers into which sand may be diverted from the belt by automatically actuated and normally retracted plows, the movement of which is subject to the control of electrical probes in the individual molding hoppers and through which current is supplied to relays controlling the operation of the mechanism.

When the mechanism is in operation, the various gates, valves and switches may conveniently be operated by a sequence controller which comprises a cam shaft having its cam set to control the various valves and switches to operate the mechanisms in proper sequence. One of the switches actuated by the sequence controller is a switch controlling an interval timer. The timer is simply an electric clock mechanism which, in turn, controls a switch that energizes and de-energizes the motor which operates the cam shaft of the sequence controller. The arrangement is such that when the motor driving the cam shaft is in operation to measure and deliver sand, water and bond into the mixer, the electric clock mechanism of the interval timer is disconnected from the electrical circuit and is at rest. At the conclusion of a cycle of operations of the cam shaft, the circuit to the interval timer clock mechanism is re-established and the timer determines a mixing period during which the mixer functions while the cam shaft is at rest. The circuit to one or the other of the interval timer clock mechanism or the sequence controller cam shaft motor is closed at all times when the device is in operation.

In the drawings:
FIG. 1 is a diagrammatic general view of apparatus embodying the invention with particular reference to the connections for the operation of the various valves and switches.
FIG. 2 is a diagrammatic showing of the electrical circuits related to the mechanism illustrated in FIG. 1.
FIG. 3 is a view in front elevation of integrating mechanism for measuring a supply of water proportioned to the moisture and temperature of the sand with which it is to be mixed, portions of the front wall of the instrument being broken away to expose its interior construction.
FIG. 4 is a bottom plan view of a portion of the apparatus shown in FIG. 3, wherein current passing between the probes in the sand hopper in integrated with current proportioned to the amount of water supplied.
FIG. 5 is a view taken in section on line 5—5 of FIG. 4.
FIG. 6 is an enlarged detail view in side elevation in the plane indicated at 6—6 of FIG. 5.
FIG. 7 is a view in front elevation of the interval timer and sequence controller with its cover removed.
FIG. 8 is a view in front elevation on a reduced scale showing the device of FIG. 7 with its cover in place.
FIG. 9 is a view similar to FIG. 8 showing the device in rear elevation.
FIG. 10 is a detail view in section on the line 10—10 of FIG. 7.
FIG. 11 shows the device of FIG. 7 in section in the plane indicated at 11—11 in FIG. 7.
FIG. 12 is a view taken in section on the line 12—12 of FIG. 7.
FIG. 13 is a view taken in section on an enlarged scale on the line 13—13 of FIG. 7.
FIG. 14 is a view taken in section on the line 14—14 of FIG. 13.
FIG. 15 is a view in fragmentary perspective showing a portion of the manifold illustrated in FIGS. 11, 13, 14 and 15.
FIG. 16 is a diagrammatic view showing a modified embodiment of motion transmitting connections between certain parts.
FIG. 17 is a detail view on an enlarged scale showing the manner in which such connections are applied to a thermometer illustrated in FIG. 16.
FIG. 18 is an enlarged fragmentary view in front elevation showing a modified embodiment of apparatus forming a part of the system.
FIG. 19 is a view taken in section through a portion of the apparatus of FIG. 18.
FIG. 20 is a view taken in section on the line 20—20 of FIG. 18.
FIG. 21 is a diagrammatic plan view showing the connection of the apparatus of FIGS. 18 to 20.
FIG. 22 is a chart showing the functioning of various parts of the apparatus in a complete cycle.

To facilitate cross reference to my co-pending application 279,369, I have designated some of the major portions of the present apparatus by the reference characters used in that application. The sand storage bin is at 14. Sand is delivered therefrom subject to the control of the gates 15 actuated by air cylinder 16, into the batch hopper 18, where automatic readings of its moisture and temperature are taken. From this hopper, the sand is discharged subject to the control of the gates 19 into the mixer 10. Gates 19 are operated by an air cylinder 21. The mixer 10 may be of any appropriate type. In practice, I have used a device similar to that shown in McIlvaine Patent 2,593,327.

Water for the batch discharged from batch hopper 18 into the mixer 10 is supplied from a batch measuring water tank 30. Water enters the tanks through pipe 31 subject to the control of a solenoid actuated valve 32. The batch of water accumulated in tank 30 is determined by a float 33 in the tank to which is connected a rack 34 meshing with a pinion 35 from which motion is transmitted through bevel gears 36 and 37 and shaft 38 toward the integrating device hereinafter to be described. Since it is important that the water move rapidly from the tank 30 to the mixer, I provide a large communicating pipe at 12 through which the water is dumped from the tank subject to the control of a valve at 43 controlled by air cylinder 40.

Within the batch hopper 18 is a thermometer 50 and electrical probes 130 and 131, all of which are connected with the integrating device in the manner hereinafter to be described.

Since the present device is fully automatic, it incorporates means for delivering either powdered bond or slurry, as may be required, into the mixer to be incorporated in the batch of sand and water mixed therein. If the bond is dry, it is desirably measured in the apparatus disclosed in my co-pending Patent 2,742,201, issued April 17, 1956, and entitled "Variable Capacity Batch Measuring System." In accordance with that application, the powdered bond is stored in a bin 7 from which it passes into a metering chamber 10′ having telescopically related wall sections 11. The capacity of the chamber is varied by sliding the sections upon each other to vary the length of the chamber by means disclosed in the above identified companion application. The rock shaft 12′ oscillated by air cylinder 15 opens and closes valves at the top and bottom of the chamber respectively (the valves are not shown in this application), the arrangement being such that when either is open the other is closed. In this way, measured quantities of the powdered bond can be successively delivered through the pipe 17 into the mixer 10.

As suggested in the McIlvaine Patent 2,593,327, I prefer to use a pair of blowers at 23 and 24 connected with the mixer. Blower 23 introduces fresh air into the mixer through pipe 25 subject to the control of damper 26. Blower 24 withdraws dust and air from the mixer through pipe 27 subject to the control of damper 28. The respective dampers are operated pneumatically in a manner hereinafter to be described. The blowers are left in constant operation so that air flow can be instantly established or cut off by manipulation of the respective dampers.

When the operation of mixer 10 is complete, the batch of sand is discharged from the bottom of the mixer through the pipe 44 subject to the control of the valve gates 45 which are operated by air cylinder 46. The flow passes into a chamber 47 whose bottom is formed by conveyor belt 48 operated by motor 49 to move from right to left as viewed in FIG. 1. At the side of the chamber toward which the belt 48 moves, there is an opening 51 which permits a layer 52 of molding sand to move with the belt at a substantially uniform depth thereon. The belt 48 serves any desired number of molding stations, where each molder is provided with stored molding sand in a hopper 53 or 54 from which he can withdraw the sand through a gate 55 as needed. At each station, there is a normally retracted plow 56 which may be lowered into engagement with the conveyor 48 to deflect into the underlying hopper 53 or 54 some of the sand moving with the conveyor. Each of the plows 56 is operated between the retracted position shown over hopper 54 and the advanced or operative position shown over hopper 53 by means of an appropriate air cylinder 57 actuated automatically in the manner hereinafter to be described.

The automatic operation is such that when all of the several hoppers 53, 54, etc. contain a sufficient quantity of molding sand to meet immediate requirements, the operation of the conveyor 48 ceases and the entire apparatus shuts down. During normal operation, this will seldom, if ever, happen. One or another of the molder's hoppers will constantly require replenishment and the automatic mixing and delivery of the sand will continue to satisfy these requirements. Assuming that the apparatus is temporarily shut down, the arrangement is such that as soon as any one of the hoppers requires additional molding sand, the conveyor 48 will start to operate for the delivery of the required sand and the rest of the apparatus will resume operation for the automatic mixing of another batch and discharge thereof into the supply chamber 47 through which the conveyor 48 operates.

Having now described the general organization of the device, I shall describe its individual components.

As explained more particularly in my application 279,369, I provide an integrating instrument generically designated in FIG. 3 by reference character 60. The sand which reaches the batch hopper 18 from the bin 14 may vary widely as to its temperature and moisture content. By adjustment of the knob 76 in the manner referred to in application 279,369, the operator may select the general moisture conditions he desires to maintain. However, if the sand is hot, an excess of water should be introduced into the batch. Accordingly, the integrating instrument serves to permit a variation of the amount of water introduced into the measuring tank 30 according to the temperature of the particular batch of sand accumulated in the batch hopper 18. The initial moisture content of the sand further affects the requirements and the integrating instrument 60 is further adapted to take this into account in determining the amount of water measured in tank 30 for delivery into the batch.

To accomplish these results, the solenoid valve 32 which permits water to enter the measuring tank 30 is controlled by a sensitive switch 90 which is normally closed and has a contact actuator at 91 positioned for engagement with an arm 70. The point at which such engagement is effected can be varied by movement of either the arm 70 or the switch 90. By means disclosed in the above entitled application, the arm 70 is moved to and from the point of engagement with switch actuator 91 by temperature operated connections from the thermometer bulb 50 in the sand batch hopper 18. These connections extend to the needle or pointer 66, which operates over dial 67. The switch itself is bodily movable to and from the point of engagement between arm 70 and switch actuator 91, its movement being effected in part by the flexible shaft 38, operated by the float 33 in the water measuring tank 30. As disclosed in the said application 279,369, the flexible shaft has a driving connection through a train of gears which includes the gear 83. The amount of water in the tank 30 is further indicated by connections which enable the movement of the flexible shaft 38 to be communicated to the pointer 980, mounted coaxially with pointer 66 and also movable over dial 67. As the tank 30 fills, pointer 980 will move toward registry with the thermometer pointer 66 and the arrangement is such that when the pointers register, the arm 70 and the switch actuator 91 will engage to open switch 90, thereby closing valve 32 to shut off admission of water into the measuring tank 30. The higher the temperature, the greater the amount of water that will have to be admitted into tank 30 before the pointers will register and the switch will open. When the knob 76 is manipulated to fix the initial setting as to water requirements, the effect of its operation is to temporarily disconnect the integrating apparatus from the flexible shaft and to enable both the pointer and the switch to be moved independently of the shaft to a greater or lesser distance from the point at which the switch will be opened by engagement with arm 70.

In accordance with the present invention, the switch is not directly coupled to gear 83 to be moved thereby. Instead, the lever 88 which supports switch 90 is connected by link 85 with a lever 84 that is pivoted at 87 upon the gear 83. The inner end of lever 84 overlies the gear and projects substantially to the axis thereof, where it is attached to another link 185. Insofar as the link 185 remains stationary, lever 84 will move with the gear. Insofar as link 185 moves longitudinally, its movement will affect the otherwise direct communication of motion from the gear to the switch, either adding to or subtracting from the extent of such motion according to the direction of displacement of link 185.

In my companion application 279,369, I disclosed how the link 185 could be displaced in steps proportioned in a general way to the initial moisture content of the sand temporarily present in the batch hopper. In the present device, I have eliminated the steps and have provided an infinite ratio proportioning means in which, throughout its range, the displacement of link 185 is exactly related to the sand moisture. Thus the sand moisture as well as the temperature becomes a factor in determining the amount of water which will be admitted into the measuring tank 30 before the valve 32 shuts off in consequence of the opening of switch 90.

The lower portion of the diagram shown in FIG. 2 best illustrates how this result is accomplished. I have previously referred to the probes 130 and 131 in the sand batch hopper 18. These are illustrated in FIG. 2, which shows them supplied with rectified current from the transformer secondary 93 and rectifier 94. One side of the secondary is illustrated as being connected directly with probe 131. The other side connects to the winding of a relay 95 which may be, for example, of a type which will close its contacts at 96 when a current of 5 milliamperes or more passes through it. This winding is connected with the winding of a second relay 97 which may, for example, be of a type which will close its contacts at 98 when 10 milliamperes passes through it. These figures are given solely by way of example and are not intended to limit the choice of values for these relays.

From the winding of the relay 97, lead 99 goes to the variable contact of a rheostat 100, the resistance of which is connected by lead 101 to probe 130.

Energization of the first relay, 95, establishes a circuit through its contact 96 to a double pole relay 102. At the same time, relay 95 energizes the contact 103 of relay 102 so that, upon energization of relay 102, current passes from contact 103 thereof to the moving contact 104 thereof to initiate forward rotative motion of the extended armature shaft 107 of motor 105.

An appropriate mechanical organization is shown in FIGS. 4 and 5. The armature shaft 106 of motor 105 drives shaft 107 on which worm 108 drives cross shaft 109 to rotate the moving contact of rheostat 100. Shaft 109 also drives a cam shaft 110 through gears 111 and 112. The cams on this shaft operate in proper sequence a series of switches as shown in FIGS. 2, 5 and 6.

The very first movement of the cam shaft 110 closes switch 120 for supplying current to the moving contact 121 of relay 122. It is the ultimate function of contact 121 to control a supply of current to the contact 123 of the relay 102 and to act as a limit switch to interrupt a reversing circuit to the motor 105 during a later operation in which motor 105 rotates cam shaft 110 back to its starting point. Since the reversing circuit is not established except at the conclusion of a cycle of operation of the cam shaft 110, the mere closing of switch 120 at the commencement of the cycle has no effect on the continued rotation of the cam shaft beyond the point at which switch 120 is initially closed.

The second switch to be closed is switch 115. Action of cam 137 on cam follower 138 actuates switch 115, which closes a shunt circuit around relay 95, whereby its contact 96 resumes its normally open position. If the amount of current passing between the probes 130 and 131 has been inadequate to actuate relay 97, this terminates the movement of the parts for the time being, the motor being thereupon deenergized. However, if relay 97 has been energized, the motor 105 will continue to be supplied with current through the contacts 98 of relay 97 and the rotation of shaft 107 will continue.

Switches 116, 117, 118 and 119 merely control the pilot lights diagrammatically illustrated in FIG. 2 for the purpose of giving the operator information of the approximate range in which the water control is functioning.

However, as the motor 105 continues to operate, it is advancing the moving contact of the rheostat 100 to gradually increase the resistance in the circuit between probes 130 and 131. Ultimately the resistance will reach a value at which current flow between the probes will no longer be sufficient to maintain the relay 97 energized and the moving contact 98 of such relay will drop to its normally open position.

Whenever the contacts of relay 97 open, the relay 102 is deenergized and its contacts swing to positions shown in FIG. 2, thus breaking the forward driving circuit of motor 105 and not only arresting forward movement of the cam shaft but establishing a reversing circuit to the motor. As above stated, the contact 121 of relay 122 is in series with this reversing circuit and is controlled by the limit switch 120 so that, whenever the motor shaft 107 reaches the starting position, the reversing operation thereof terminates and the parts are in readiness for another cycle of operation.

When the shaft 107 is rotated by motor 105 to a position determined by a correlation of the rheostat 100 to the amount of current flowing between the probes 130 and 131, the object of such rotation is to adjust the position of the link 185 and thereby to modify the position of bodily movement of switch 90 from that which would otherwise be determined solely by the amount of water admitted into the measuring tank. To achieve this result, shaft 107 is provided with a worm at 186 which drives a cross shaft 187 carrying a pinion 188 meshing with a gear 189 on a rock shaft 190. The arm 191 on rock shaft 190 is slotted at 192 to receive a pivot bolt 193 to which link 185 is connected. Adjustments to control the effect of the motor rotation upon the position of switch 90 can be made by shifting the pivot bolt 193 in the slot 192 until the functioning of this apparatus accurately reflects the desired correction of the position of switch 90 in accordance with the amount of water already in the sand. The initial wetness of the sand in the batch hopper is very accurately related to the amount of current which will pass between the probes 130 and 131 and the compensating adjustment of the switch to reduce the amount of water to be admitted to the tank for incorporation in the batch is accurately determined by balancing the extent of switch movement, as determined by the resistance of the rheostat, against the amount of current which is flowing.

The operating connections from the sensitive integrating switch 90 to the valve 32 which controls admission of water into the measuring tank 30 includes a circuit closing relay 124 and means for delaying the immediate response thereof. The object of the delay is to give ample time for the thermometer bulb 50 in the batch hopper to respond to the temperature of the sand which surrounds it. I have found it convenient to use a vaccum tube 125 to perform the delaying function. The circuit to the relay 124 must pass between the plates 126 and 127 of the tube and no current will flow until the filament 128' has had time to heat, following the closing of switch 90. When the filament has heated and current flows between the plates 126 and 127, the relay 124 is energized to control the circuit to the solenoid 129'. The armature 140 of this solenoid is connected by lever 141 with the water valve 32 in a manner such that the valve is open whenever the solenoid 129 is actuated. As above stated, the sensitive switch 90 opens to deenergize this solenoid as soon as the amount of water entering the measuring tank 30 moves the switch 90 bodily to a position in which its actuator 91 engages the finger 70 at the position to which such finger has been moved by the mechanism responsive to the temperature of the sand.

Except for the mechanism shown in FIGS. 2 to 6 for the stepless determination of the metered quantity of water in exact proportion to the requirements of the sand, the arrangement thus far described is comparable to that disclosed in my above entitled companion application 279,369. I shall now describe means whereby the entire system is made to function automatically.

In each of the molder's hoppers 53 and 54, from which individual molders withdraw their requirement for molding sand for making molds, I provide a pair of probes. These probes are associated with relays which have a predetermined differential response to close only when substantially the full predetermined length of the probes is exposed to wet sand, the relays reopening only when there remains but a nominal length of the probes exposed to sand through which current can pass from one probe to the other. Two separate arrangements for this purpose have been shown in FIG. 1. The first installation is one in which the hopper 53 is of relatively small depth. The probes 150 and 151 extend from top to bottom of the hopper. The relay 152 is of a well known type in which there is a substantial differential between the current required to close it and a much lower value of current flow above which it will not re-open. When the hopper 53 is substantially full of sand, the current passing between the probes 150 and 151 will energize the relay 152 to close the circuit to the solenoid air valve 153 to admit air to the cylinder 57 whereby to lift the plow 56 from the path of the layers of sand 52 advancing on conveyor 48. Not until the sand has almost all been discharged from the hopper 53 will the flow of current between the probes 150 and 151 become sufficiently low to permit relay 152 to re-open, to close valve 153 and thereby to drop the plow 56 back into the hopper filling position in which it is shown in FIG. 1.

The installation in hopper 54 is similar in effect but, due to the great height of this hopper, the probes 150' and 151' are divided, having extensions 150'' and 151'' at the bottom of the hopper, the extensions being electrically connected with the corresponding probe sections at the top of the hopper. The physical arrangement is shown in FIG. 1 and the electrical connections are diagrammed in FIG. 2, it being understood that the circuit and operation are essentially similar whether the probes are all in one continuous length as in hopper 53 or are divided as in hopper 54. It is also immaterial whether the electrical connections between probes and extensions are series or parallel.

The transformer secondary at 159 supplies current across the probes through the coil 160 of the relay 152. This relay has a substantial differential of response due to the fact that the magnetic attraction of the armature by the coil is much stronger when the armature is close to the coil than it is when the armature is remote from the coil. Hence, instead of the solenoid type relay shown at some points in the electrical diagram, I have here shown an ordinary magnetic relay to assure the differential action. When the coil is energized to the degree which occurs when the sand substantially fully embeds the probes, the armature 161 is attracted sufficiently to engage the stationary contact 162, thereby energizing the solenoid coil 163 of relay 165 to close the circuit to the solenoid air valve 153 for lifting plow 56 and to open the circuit to conveyor motor 49 and also the circuit to the interval timer 170 and sequence controller 171 which control the measuring and mixing operations. It will be understood that the operating connections to the conveyor motor 49 and the interval timer and sequence controller are in multiple with connections from other hoppers exemplified in FIG. 2 by the conductors 166 and 167 so that the measuring, mixing and delivering mechanisms can be energized from any of the individual hoppers along the path of the conveyor belt.

When the plow 56 above any of the individual molder's hoppers is lowered to divert sand into the hopper, its corresponding relay 165 will be in the position shown in FIG. 2, with the circuits to the interval timer and the conveyor motor closed so that the mixing operations will be in process and the conveyor belt in operation. This can only happen, however, when the flow of current between the probes drops to a nominal value. In the case of the hopper 54, the length of the probe extensions at 150'' and 151'' is sufficient to pass through the damp sand a sufficient current to hold the relay 152 closed, with the plow raised. Only when the sand drops somewhat below the tops of the extension probes 150'' and 151'' will the current drop below the value necessary to hold relay 152 closed. Only then will the current from this particular set of probes activate the conveyor belt and the measuring and mixing apparatus and only then will the plow 56 of this particular hopper descend to re-fill the hopper with sand. Once the plow descends, due to the deenergization of the relay at 152, it will remain down, and the circuits controlling the mixing and delivery of sand will continue energized from this relay, until the sand reaches a point near the top of the hopper. In other words, most of the combined length of the probes and probe extensions is required for sufficient current flow to close the relay 152, while sand surrounding something less than the length of the extensions alone (or a correspondingly short length of integral probes 150 and 151) will permit sufficient flow to hold the relay shut.

The operation of the interval timer and sequence controller will now be described.

When coil 163 of relay 165 is deenergized to lower one of the plows 56, the contacts 172 and 173 are also closed to engage respectively the fixed contacts 174 and 175. Contacts 172 and 174 are in the circuit to the motor 49 of conveyor belt 48. Contacts 173 and 175 close a circuit through the series connected switches 141 and 128 and normally closed cam operated switches 177 and 178 to the sequence controller motor 180 (see FIGS. 2 and 7). It has already been explained that one of the mercury switches 128 is mounted on a paddle 129 so positioned that switch 128 will not be closed unless the batch hopper 18 is full of sand, while the other mercury switch 141 is mounted on the lever that controls water inlet valve 32, the arrangement being such that this switch will be open until such valve is closed as a result of an adequate supply of water being present in tank 30. Thus the sequence controller motor 180 will not start until an adequate batch of sand and an adequate batch of water are in readiness.

It will be understood that the amount of water measured into the water tank is not only related to the measured water content of the sand in the batch hopper, but presupposes that the batch hopper is filled to a predetermined level. Accordingly, whether the system is manually controlled or is controlled automatically by the timer and the sequence motor as above described, it is desirable to use the paddle 129 and switch 128 as a means of indicating to the operator, or electrically controlling the system to preclude its operation, if the sand hopper is not adequately filled with sand to require the amount of water for which the integrating mechanism is set.

For hand operation in starting or otherwise a crank may be applied to coupling 179 on sequence controller cam shaft 183 to operate such shaft without energizing its motor. A switch is also provided at 168 for switching from automatic to manual operation. In its dotted line position it is in series with a push button switch 169 directly connected with the line and bypassing probes 150 and 151 and switches 128 and 141. When this arrangement is used, the closing of switch 169 will operate the mechanisms to produce and deliver sand as if there were demand at the hoppers 54 and regardless of the interlock switches 128 and 141. Each molder's hopper is also provided with a switch 164 for raising the corresponding plow if it is desired to empty the hopper, or when that station is not in use.

The motor 180 operates through a reducer 181 and gears 182 (FIG. 7) to drive the cam shaft 183 having cams 184, 185, 186, 187, 188 and 189 (FIG. 1 and FIG. 7) operating through appropriate followers such as that shown at 190 in FIG. 13 for controlling the valves which open and close all the pneumatic circuits in proper sequence. Mechanically, the cam shaft may conveniently be mounted on a manifold 220 having internally an air pressure passage 221, connected with any suitable source of compressed air, and an air exhaust passage 222. Both passages extend longitudinally of the block. Extending through the block from front to rear are passages 223 and 224 leading to opposite ends of respective sets of ram cylinders. On the front of the block are twin valve housings 225 (FIG. 14) each of which has for valve seats respectively controlled by valves 226, 227, 228 and 229. Valves 226 and 228 are axially aligned and open in opposite directions. Valves 227 and 229 are similarly arranged. A passage 230 into which the valves 227, 229 open communicates through port 231 (FIG. 15) with the air pressure passage 221 of the manifold. Valve housing passage 232, from which valves 226 and 228 open outwardly, communicates through a port 233 with the exhaust passage 222 of the manifold 220.

Valve 226 opens outwardly into a passage 234 leading to the inside of the port controlled by valve 229. Similarly valve 228 opens outwardly into a passage 235 leading to the inside of the port controlled by valve 227. Passage 234 in the valve housing is thus adapted to receive pressure through valve 229 when the latter is open, or to be placed in communication with the exhaust passage 222 when valve 229 is closed and valve 226 is open. The passage 234, thus supplied either with pressure or exhaust connections, registers with the bore 223 extending through the manifold casting 220 and with which one end of one of the ram cylinders is connected.

Similarly passage 235 is subject to pressure when valve 227 is open as shown in FIG. 14 and communicates with the atmosphere when valve 228 is open, the latter valve being shown closed in FIG. 14. Passage 235 registers with the bore 224 of the manifold, which leads to the other end of the cylinder with which bore 223 communicates. Accordingly the piston in the ram cylinder can be operated in either direction when either end of the cylinder is subject to pressure and the other end to vacuum.

Mounted on the valve housing is a bracket 240, on which is pivoted a bell crank 241 carrying the cam follower 190 and bifurcated to provide arms 242 and 243 which lie between the ends of the opposed valve pairs as shown in FIGS. 13 and 14. The four valves in each valve housing connect the operating lines which communicate with bores 223 and 224 alternately with pressure and exhaust. The respective cams throw the bell crank 241 in one direction while the respective springs 244 acting through links 245 on the bell cranks hold the cam follower rollers 190 against the cams and throw the valves in the opposite direction.

Each of the respective bores 223 is desirably provided with its own individual pressure switch at 246, the latter being connected to energize individual pilot lights at 247 as shown diagrammatically in FIG. 2. The pilot lights may be located as shown in FIG. 8. The lighting of a given lamp will indicate the functioning of the pressure controlled valve or gate operated by the ram to which air is supplied through one of the bores 223, wherein the admission of pressure immediately closes the corresponding switch 246.

Pilot lights 259 and 260 show operation of the sequence motor 180 and timer motor 270, respectively.

In actual practice, the first cam from the left in FIGS. 1 and 7 is used to open the muller air exhaust damper 28 by supplying air to the cylinder 248 in a damper opening direction. The second cam 185 opens the damper 26 in the air input line from blower 23 into mixer 10, this being accomplished by applying pressure to the top of the cylinder 249 controlling damper 26.

The third cam 186 supplies air to the outer end of the cylinder 15 to operate the measuring valves which release a batch of powdered bond from the metering chamber 10 for delivery through pipe 17 into the mixer. The fourth cam 187 supplies air to the bottom of the cylinder 40 to lift the dump valve 43 for discharging water from the metering tank 30 into the mixer. The fifth cam 188 supplies air to the outer end of the cylinder 16 to close the sand supply gates 15 at the bottom of the bin and simultaneously supplies air to the inner end of cylinder 21 to open the sand discharge gate 19 at the bottom of the batch hopper for delivery of the sand batch into the mixer.

The cam 189 does not function until the mixing operation has been completed, as controlled by timer 170 in a manner hereinafter described, at which time it admits air to the inner end of cylinder 46 to open the gates 45 to discharge the mixed sand onto the conveyor apron 48.

The extent or dwell of the several cams is so chosen that the converse of the operations above described will occur in proper sequence as indicated in FIG. 22 wherein the relative periods for which the respective doors, valves or gates are open, and the interval timer is in operation, are diagrammatically shown.

In addition to the cams provided on shaft 183 for the control of the air connection, the said shaft carries cams 255 and 256 for controlling switches 177 and 258, respectively (FIGS. 7, 10 and 2). It is necessary that switch 177 be closed as a prerequisite to the operation of the sequence controller motor 180. At the end of the cycle, this switch opens to stop motor 180 unless there is a continued call for sand. In that case, and also to initiate the cycle, switch 177 is bypassed through switches 141 and 128, energized through the probe-controlled relay 152 of one of the molder's hoppers.

As the cam shaft rotates and ultimately opens switch 177 at the conclusion of the cycle of pneumatic operation of the measuring, mixing and delivery of the sand, cam 256 ultimately closes switch 258 to energize the relay 265. This relay breaks the circuit through its contact 178 to the sequence controller motor 180 and establishes a circuit through its contact 266 with the interval timer motor 270. The interval timer is a conventional piece of equipment having dials at 267 (FIG. 7 and FIG. 8) for determining its period of operation. When the timer motor has operated for the time for which it is set, it breaks its own circuit (by means not shown) thereby permitting relay 265 to return its contacts 266 and 178 back to the position of FIG. 2, whereby the circuit to the sequence controller motor is again closed.

From the foregoing, it will be understood that the sequence control motor 180 and the interval timer motor 270 operate in alternation. The timer is at rest while the sequence controller is going through its cycle. At the conclusion of that cycle, the sequence controller motor stops after energizing the interval timer motor. The latter functions for whatever period is required for the mixing of the sand in the muller 10. If there is a demand for sand at the time the mulling operation is complete, the sequence controller motor 180 will take over immediately. If not, the entire system will come to rest until further demand exists.

The complete cycle is as follows:

(1) The mixer, which is in continuous operation until the foundry is shut down, has its discharge door open at the commencement of the cycle. The first thing that happens when the sequence controller motor 180 starts is the closing of the discharge gates 45 of the mixer.

(2) The water, the sand and the bond are dumped into the mixer in rapid sequence and the respective valves controlling delivery close after delivery is made. The bond supply gate into chamber 10 from the hopper 7 opens to measure a fresh supply of bond into chamber 10 as the discharge gate from such chamber 10 closes.

(3) The sand bin gate 15, closed during the dumping of the sand from the batch hopper, now opens for refilling the batch hopper and remains open, delivery being limited by the extent to which the sand can flow. The water supply valve 32 is opened for a time controlled by the integrating and apportioning apparatus above described.

(4) The air exhaust damper from the mixer opens slightly in advance of the opening of the air supply damper and remains open during the functioning of the interval timer while the mixing operation proceeds.

The interval timer then commences to operate while the sequence controlling motor is at rest. The first thing that happens at the conclusion of the operation of the interval timer is to reenergize the sequence controller motor. This is followed by the closing of the air inlet damper and the closing of the air exhaust damper and the closing of the mixer discharge door.

FIGS. 16 and 17 are intended merely to suggest the fact that electrical servo-motors and their connecting wiring may be used instead of mechanical transmitting connections between the various parts of the system as above described. Thus the thermometer bulb 50 in FIGS. 16 and 17 has its tube connected through segment 260 and pinion 261 to the shaft 262 of a so-called "Selsyn" motor at 263 which has line connections at 264 and three-phase output connections at 265 leading to the slave motor 266, connected to the line at 267. The pinion 268 driven by the motor 266 meshes with segment 269 to which is pivoted the link 56 of the integrating device as above described and more particularly disclosed in application 279,369 (Patent No. 2,709,843).

Similarly, the measuring float 33 in the water measuring tank 30 drives a "Selsyn" motor at 270 having a line connection 271 and a three-phase connection 272 to the slave motor 273 which drives shaft 71 in the integrating device as above described. Thus the electrical connections and synchronized driving and driven motors of FIGS. 16 and 17 transmit motion to the same parts and for the same purposes as do the mechanical connections previously disclosed.

FIGS. 18 to 21 disclose a further slight modification intended for use when a suspension of bond in water in the form known as slurry is to be substituted for powdered bond. In such a case, it is desired that the slurry be measured into the water measuring tank 30 from a slurry supply tank 275. Since the slurry is largely water, it should be included as a part of the batch accumulated in tank 30 in an amount integrated with the moisture content and heat of the sand.

It will be recalled that the shaft 71 of the integrating instrument is driven from a float in water measuring tank 30 to operate worm gear 74 as disclosed in my application above identified. For slurry control, a second worm gear 276 meshes with worm 73 opposite worm gear 74. Worm gear 276 is mounted on shaft 277 for rotation. It is also axially movable with the shaft against the bias of the spring 278. It carries a pointer 279 operating over a scale 280 on the dial. It also carries a cam 285 engaged with a cam follower 286 on an actuator 287 for switch 288. As shown in FIG. 21, switch 288 is a double throw switch and is in series with the integrating switch 90.

The knob 289 on the shaft 277 enables the shaft 277 to be pulled axially outwardly to withdraw its worm gear 276 from mesh with worm 71, whereby the shaft may be rotated free of engagement with the worm to locate the pointer 279 at any desired location on dial 280 and to locate its cam 285 in a corresponding relation beneath the cam follower 286 to determine the interval of shaft rotation before the cam follower drops from the cam to permit the shift of switch 288 from the position shown in FIG. 21 to its alternate double throw position. Once the shaft is rotated to set it in a position to give the required amount of slurry, it is released to permit its spring 278 to reengage worm gear 276 with worm 73. Thereupon, according to the length of cam travel beneath the cam follower during the initial operation of the worm, the switch 288 will remain in its first position for a greater or shorter length of time before dropping into its dotted line position of FIG. 21.

With the switch 288 in the full line position shown in FIG. 21, and the integrating switch 90 closed, as shown in that view, the first thing that will happen will be the closing of relay 290 to energize solenoid valve 291 for delivering slurry into the supply pipe 31 leading into the water measuring tank 30. This will cause the float 33 in such tank to rise. Ultimately the motion communicated from the float to the shaft 71 of the integrating instrument will rotate the cam 285 to a position such that the contact of switch 288 will move from the full line position of FIG. 21 to dotted line position thereof. At that point, the slurry valve 291 will close due to the deenergization of relay 290. Instead, the relay 293 will be energized to open the water inlet valve 32. The valves are desirably close together so that the fresh water will clear the pipe of slurry.

The rotation of worm 73 during the admission of the slurry into tank 30 will have rotated worm gear 74 as well as worm gear 276. Both gears will continue to rotate as water enters the tank after the supply of slurry is cut off. Thus the ultimate position to which the switch 90 is rotated by the action of the float will represent a composite value of the slurry and water so that the liquid content of the slurry may be taken into consideration in the automatic integration of the water batch with the water content of the sand and the heat of the sand as above described.

From the foregoing, it will be understood that I have provided means whereby the measuring, proportioning, mixing and delivery of foundry sand is made entirely automatic, with safeguards for all contingencies, to function either continuously in cycles or to start and stop functioning in accordance with the needs of the system without the attention of an operator and with greater accuracy than could result if the most skilled operator were in charge.

I claim:

1. In a device of the character described, the combination with a mixer, of a sand batch hopper arranged to discharge into the mixer, a water measuring tank arranged to discharge into the mixer, and a bond measuring device arranged to discharge into the mixer, supply means for supplying sand to the batch hopper, water to the tank and bond to the bond measuring device, valves controlling the respective supply means, other valves controlling the discharge from the batch hopper and the tank and bond measuring device into the mixer, a sequence controller comprising a motor driven cam shaft, and cam operated means for actuating the several valves in proper sequence for measuring successive batches of material for delivery into the mixer, and a timer responsive automatically to said sequence controller for control of the time interval of mixer operations.

2. The device of claim 1 in which the inlet valve to the water measuring tank has an integrating control for which the sand batch hopper is provided with a thermometer and electrical probe means exposed to sand within the batch hopper and operatively connected with the integrating control to regulate the closing of said water inlet valve so as to proportion the amount of water delivered to the tank to the moisture content and temperature of the sand in the batch hopper.

3. The combination with a sand batch hopper and a water batch measuring tank and a mixer into which said hopper and tank have discharge connections, of electrical moisture probe contact means and thermometer means both exposed to sand in the sand batch hopper, a water tank measuring valve and means for actuating the valve and including integrating connections to the probe means and the thermometer means for actuating the valve at a time such that the water measured in the tank will be related accurately to the moisture content and the temperature of the sand in the batch hopper, means for delivering bond into said tank into the form of a slurry containing water and for interrupting delivery of bond to said tank after a predetermined amount of bond has been delivered and before the valve is opened for admission of water, whereby the water content of said slurry will be accumulated in said tank against the requirements as determined by said integrating device.

4. In a device of the character described, the combination with a mixer, of a source of granular material therefor, a water source therefor and a bond measuring device therefore, valve means controlling the transfer from the said source of granular material, source of water and bond measuring device into the mixer, a sequence controller for automatically actuating the several valve means in proper sequence for supplying measured quantities from said material source, water source and bond measuring device into said mixer, and a timer responsive automatically to said sequence controller for control of the time interval of mixer operations, the valve means for the water source having an integrating control for which said granular material is provided with moisture and temperature sensing means to regulate actuation of said valve means to proportion the quantity of water supplied to the mixer to the moisture content and temperature of the granular material.

References Cited by the Examiner
UNITED STATES PATENTS

| | | | |
|---|---|---|---|
| 1,907,089 | 5/33 | Pabst | 198—37 |
| 2,263,797 | 11/41 | Christensen | 22—89 |
| 2,273,126 | 2/42 | McGillin | 22—89 |
| 2,487,139 | 11/49 | Jackson | 22—217 X |
| 2,530,074 | 11/50 | Parisi | 214—17 |
| 2,537,005 | 1/51 | Brown et al. | 214—17 |
| 2,626,719 | 1/53 | Stock | 214—17 |
| 2,638,248 | 5/53 | Alvord | 214—17 |
| 2,674,381 | 4/54 | Cady | 214—17 |
| 2,709,843 | 6/55 | Hartley | 22—89 |

FOREIGN PATENTS

| | | |
|---|---|---|
| 621,181 | 4/49 | Great Britain. |
| 628,336 | 8/49 | Great Britain. |
| 631,053 | 10/49 | Great Britain. |

OTHER REFERENCES

Foundry Trade Journal, Page 432, Apr. 16, 1953.

MICHAEL V. BRINDISI, *Primary Examiner.*

NEDWIN BERGER, RAY K. WINDHAM, CLAUDE A. LE ROY, MARCUS U. LYONS, *Examiners.*